United States Patent [19]

Nagano

[11] Patent Number: 5,838,248

[45] Date of Patent: Nov. 17, 1998

[54] ELECTRONIC ARRANGEMENT AND COMMUNICATION CONTROL METHOD THEREFOR

[75] Inventor: Susumu Nagano, Chiba, Japan

[73] Assignee: Sony Corporation, Tokyo, Japan

[21] Appl. No.: 634,204

[22] Filed: Apr. 18, 1996

[30] Foreign Application Priority Data

Apr. 21, 1995 [JP] Japan .................................... 7-120881

[51] Int. Cl.⁶ .............................. H04Q 9/00; H04Q 3/00
[52] U.S. Cl. .................. 340/825.03; 340/825.07
[58] Field of Search ................ 340/825.03, 825.06, 340/825.5, 825.07, 825.02; 370/450, 451, 452, 453, 454, 391, 462, 445, 447, 448; 395/200.5; 348/9

[56] References Cited

U.S. PATENT DOCUMENTS 4,379,294  4/1983  Sutherland et al. ................. 340/825.5
5,485,147  1/1996  Jaffe et al. ........................... 340/825.5

*Primary Examiner*—Michael Horabik
*Assistant Examiner*—Jean B. Jeanglaude
*Attorney, Agent, or Firm*—Frommer Lawrence & Haug, LLP; William S. Frommer

[57] ABSTRACT

An electronic arrangement in a communication system for performing data communications among a plurality of electronic devices connected together through a bus and a method for controlling the communication system. The electronic arrangement includes a monitoring receiver for monitoring the existence of any of the electronic devices using a predetermined communication channel, a device for detecting the internal status of each of the electronic devices and a controller for allowing any of the devices to start transmitting its output by using the channel when no other electronic devices use that channel for a fixed time and the device is in an internally output-allowed state. It is possible to effectively use the communication system, to make the bus output status coincide with the internal status of each of the electronic devices and to estimate how the data outputting devices transit.

7 Claims, 7 Drawing Sheets

CSP : CYCLE START PACKET
Iso CH1 TO N : Isochronous PACKETS OF 1 TO N CHANNEL
Async A, B : Asynchronous PACKET

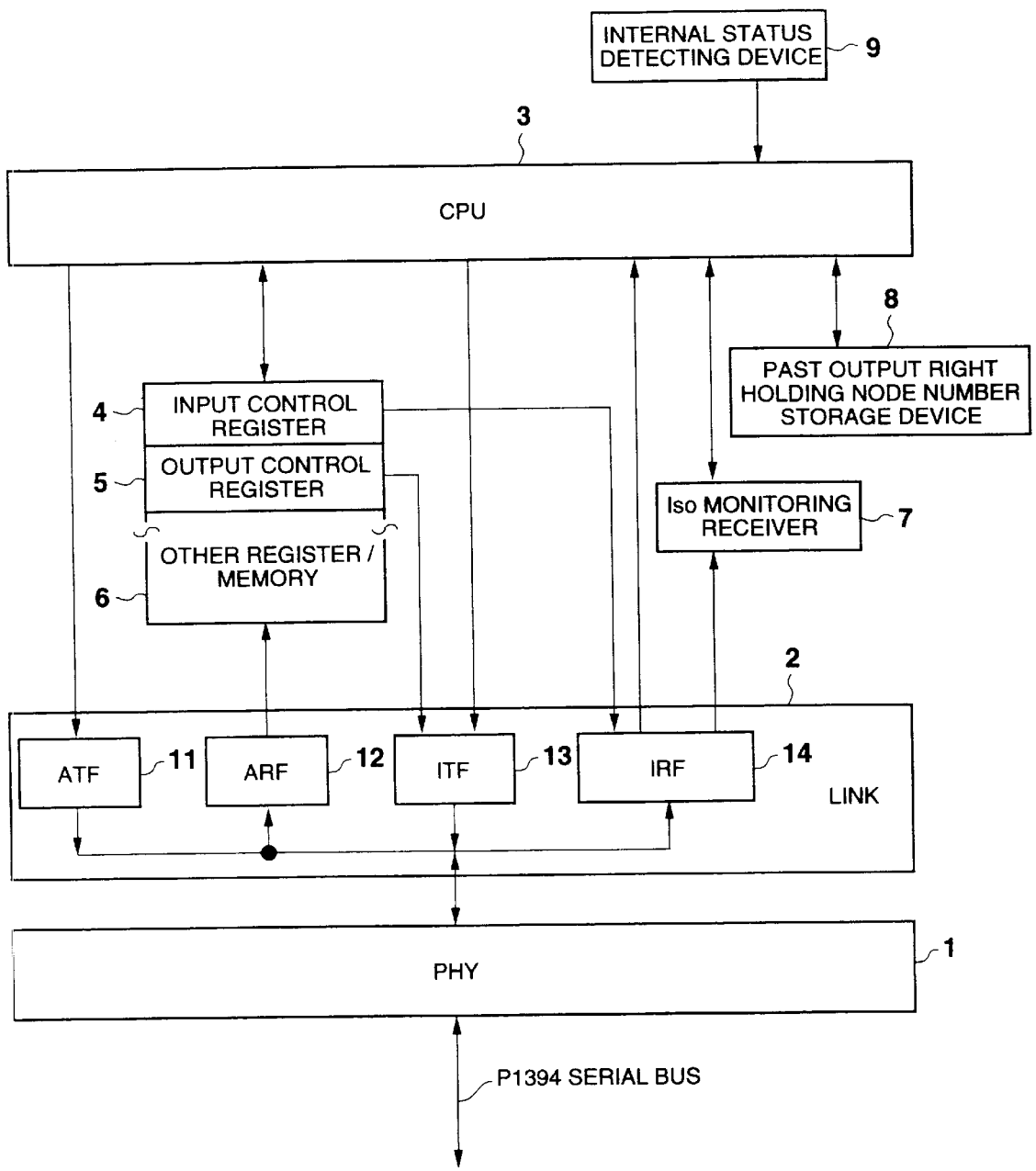

ELECTRONIC ARRANGEMENT AND COMMUNICATION CONTROL METHOD THEREFOR

BACKGROUND OF THE INVENTION

The present invention relates to a data communication system among a plurality of electronic devices connected together through a bus capable of allowing control signals and data to coexist therein and more particularly to a technique for making good use of resources of such data communication system.

A communication system using a P1394 serial bus has hitherto been proposed in which electronic equipment such as a video recorder (hereinafter referred to as "VTR"), a television receiver, a camera built-in type VTR, a computer, etc. are connected to one another through a bus which allows control signals and data to coexist therein and the control signals and the data are transmitted and received among these electronic devices.

An example of the above-described communication system will be described with reference to FIG. 1. This communication system is equipped with a VTR-A, a VTR-B, a VTR-C and an editor as electronic equipment. Connection between the VTR-A and the editor, connection between the editor and the VTR-B and connection between the VTR-B and the VTR-C are respectively performed through a P1394 serial bus through which control signals and data are transmitted in a mixed state. In this specification, these electronic devices hereinafter referred to as "nodes".

In the communication system shown in FIG. 1, communication is performed at a predetermined communication cycle (125 μs, for example) as shown in FIG. 2, and both Isochronous communication for continuously transmitting data such as digital AV signals at a predetermined data rate ("Isochronous" is hereinafter abbreviated as "Iso") and Asynchronous communication for irregularly transmitting control signals such as a connection control command, etc. can be performed according to necessity.

A cycle start packet CSP is set at a start point of a communication cycle, and a period to transmit Iso packets is set subsequently to the CSP. A plurality of Iso communications may be performed by allocating channel numbers 1,2,3, ..., N to the respective Iso packets. After completion of transmission of the Iso packets of all channels, a period until a next cycle start packet CSP is used for an Async packet communication. The Iso packet has a header to which the channel number and the node number of a transmitter node are affixed, and only one packet at maximum can be output for one channel in each communication cycle.

A node which is about to transmit an Iso packet to the bus first secures a channel to be used and a band required for data transmission. To this end, the node in question requests a bus channel and band controlling resolver node to secure a desired channel and band.

As shown in FIG. 3, the resolver node has a register indicating the state of use of each channel of the bus (CHANNELS AVAILABLE REGISTER) REG 1, and a register indicating the residual capacity of the bus (BANDWIDTH ALLOCATE REGISTER) REG 2.

The node which is about to transmit an Iso packet to the bus transmits a readout command to the registers REGs 1 and 2 with an Async packet to read out the contents of the REGs 1 and 2. If there is an empty channel and an available capacity, by using the Async packet, the node transmits to the resolver node a write-in command to write into the REGs 1 and 2 the channel and band which are desired to be used by the node. If the writing in the registers REGs 1 and 2 is found successful, the node is allowed to generate an output to the bus.

For example, a node which is desirous of transmitting an output to a channel N in a band X resets the bit of the channel N in the REG 1 to zero, and subtracts from the value of the REG 2 an amount corresponding to the band X to thereby obtain a right to transmit its output to the bus.

When the node waives its output right with respect to the bus 6, the procedure reverse to the above is performed, that is, the secured band value X is added to the REG 2, and the bit of the channel N of the REG 1 is set to 1, whereby the used channel and band are released.

When a plurality of nodes are connected to the P1394 serial bus to construct a communication system, the resolver node is automatically determined according to a manner which is specified in IEEE-P1394.

In the communication system in which a plurality of nodes are connected to one another through the P1394 serial bus, provision of an output control register is proposed to control the output of the Iso data. FIG. 4 shows an example of the output control register.

In FIG. 4, CC represents the value of a connection counter for counting the number of nodes which demand the output of Iso data from any of the nodes provided with the register. The count value can be rewritten by the node concerned or another node. CH represents a channel number on the bus through which the node outputs the Iso data, BW represents a transmission band which is currently secured by the node, DR represents the transmission rate of the Iso communication data output from the node, and r represents "reserve". An off-enable represents an output stop allowing bit for indicating whether any other node may clear the connection counter to zero to stop its output when the value of the connection counter is 1. The numeral in the parentheses on the upper side of the figure represents the number of bits.

A method having the following feature is considered as a communication control method in which a node having the output control register thus constructed outputs the Iso data with a prescribed channel.

When CC of a node is set to 1 or more, the node outputs the Iso data to the bus in a communication mode specified by CH/DR/BW. Since CC can be also set by another node when CC of a certain node is set to 0, CC of the node can be set to 1 by another node to output the Iso data to the bus.

Further, any other node which has set the CC of a certain node can subtract the value of CC by the set number. Therefore, for example, the other node sets CC to 1 and then sets CC to 0 to stop the node to output the Iso data.

Further, even if CC of a certain node is set to 1, if, at the same time, the off-enable thereof is set to 1, then any other node clears the CC and the off-enable of the node to 0 to stop the output of the Iso data of the node. Accordingly, a channel and a band which are used by the certain node can be succeeded and used by any other node to output the Iso data to the bus.

However, the communication control method as described above has had the problems described in the following paragraphs (1) to (4) with respect to the processing after a certain node which has stopped the output of another node stops its own output.

(1) where an arrangement is made in which any node which has stopped the output of another node stops its own output to release the channel and band relating thereto, the node which has been forced to stop its own output can no more transmit its output despite that it is in an internally output-allowed state and as a result, there will be no node which outputs data to the bus.

(2) Even when a specific node is provided with a command to output data, no output is made if the node is not in an output-allowed state, so that any node cannot output data to the bus.

(3) If the communication control is performed so that a node in the communication system freely starts data output to the bus when it detects that there is no other node which outputs data to the bus, it is completely unknown to the node which node outputs data to the bus after the first-mentioned node stops the output thereof, which confuses the user.

(4) If a node which has stopped its output to the bus attempts to output data by directly controlling the output control register for any other node, the output control register indicates such a state that the data is output to the bus although the node is not in an output-allowed state which may result in the destruction of the internal control on the node.

SUMMARY OF THE INVENTION

The present invention has been achieved to solve the above problems, and has an object to provide an electronic arrangement and a communication control method which can effectively use a communication system and realize a bus output status coinciding with the internal status of each of electronic devices serving as nodes in the communication system and also can estimate the shift of each device which outputs data.

The electronic arrangement and the communication control method according to the present invention are characterized in that in a communication control system in which a plurality of electronic devices are connected through a bus and data is communicated among the electronic device serving as nodes, each of the nodes starts transmitting its output to the bus by using a communication channel when there is no other node using that channel for more than a predetermined period of time and the node concerned is internally in an output-allowed state.

Further, the electronic arrangement and the communication control method according to the present invention are characterized in that in a communication system in which a plurality of nodes are connected to one another through a bus and data communication is performed among the nodes, each of the nodes stops any other node to output data to the bus, stores identification information of the another node, outputs data by using a channel used by the other node, and transmitting a command to the other node indicated by the identification information to output the data to the bus when the output of the data by the first-mentioned node is stopped.

Still further, according to the present invention, in a communication control method for a communication system in which a plurality of nodes are connected to one another through a bus, and data communication is performed among the nodes, upon receiving a command demanding data output to the bus from another after a node concerned is stopped to output data to the bus by the other node, if the node concerned is in an internally output-allowed state with respect to the bus, the node concerned secures a communication channel and a band, and then starts data output to the bus, and when the internal status of the node concerned is such that the data output is impossible, if the node concerned stops data output of any node other than the other node to the bus, the node concerned transmit the received command to the node which is stopped to output by the node concerned, and if the node concerned receives the same command again while a node outputting to the bus appears after transferring the command, the node concerned does not transfer the command again.

According to the present invention, the presence of an electronic device using a prescribed communication channel is detected by monitoring means, and the internal status of the device is detected by internal status detecting means. If the monitoring means detects that there is no electric device using the communication channel for a fixed time, and the internal status detecting means detects that the internal status of the device is in an output-allowed state, the output to the bus through the communication channel is started by the control means.

Further, according to the present invention, the identification information of an electronic device which is stopped to output by itself is stored in the storage means. When the electronic device concerned stops the data output thereof, the control means transfers the command demanding the data output to the bus to the electronic device indicated by the identification information stored in the storage means.

BRIEF DESCRIPTION OF THE DRAWINGS

FIG. 5 is a block diagram showing a main part of a node according to the present invention;

DETAILED DESCRIPTION OF THE PREFERRED EMBODIMENTS

Figure 1:
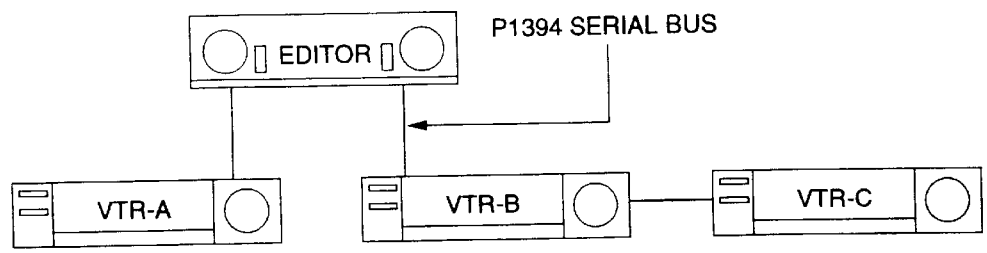
FIG. 1 is a diagram showing an example of a communication system using a P1394 serial number.
Figure 2:
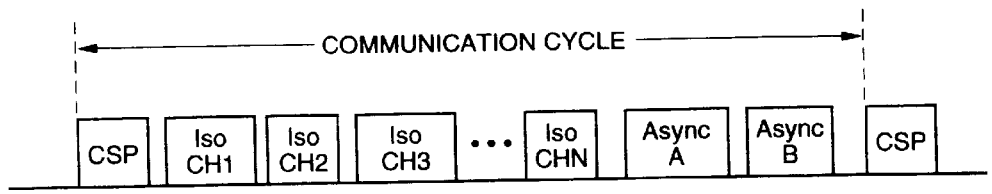
FIG. 2 is a diagram showing an example of a communication cycle of the P1394 serial bus.
Figure 3:
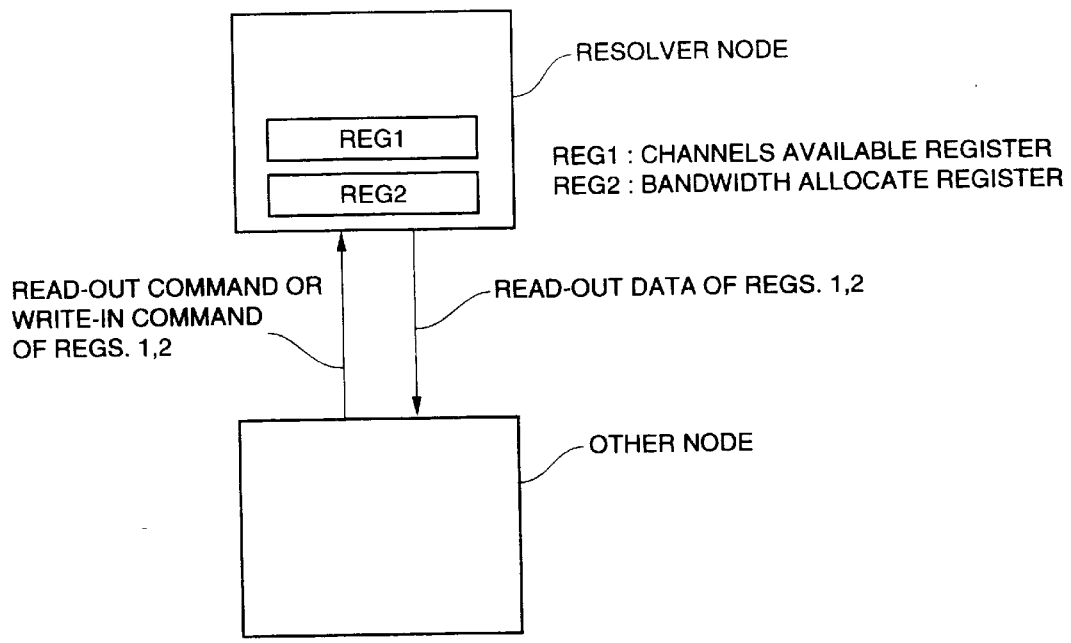
FIG. 3 is a diagram showing an example of the structure of a resolver node.

An embodiment of the present invention will be described in detail with reference to the accompanying drawings in the following order:

(1) Structure of a main part of a node according to an embodiment of the present invention
(2) Iso monitoring receiver
(3) Past output-right holding node number storage device
(4) Processing at the output stop time
(5) Processing at the output demand reception time (1) Structure of a main part of a node according to an embodiment of the present invention FIG. 5 is a block diagram showing the structure of a main part of a node according to one embodiment of the present invention. As shown in FIG. 5, the node of this embodiment includes a physical layer controller (PHY) 1, a link layer controller (LINK) 2, a CPU 3, an input control register 4, an output control register 5, a register/memory group comprising other registers/memories 6, an Iso monitoring receiver 7, a past output right holding node number storage device 8, and an internal detection device 9. The above are those elements which are required to perform communication through the P1394. Accordingly, as not illustrated in the figure, the node further includes a recording/reproducing system for digital video signals, etc. when the node is a VTR.

The physical controller 1 is connected to the P1394 serial bus, and it has functions such as initialization of the bus, data encode/decode, arbitration, etc.

The link layer controller 2 includes an Async transmission FIFO 11, an Async reception FIFO 12, an Iso transmission FIFO 13, and an Iso reception FIFO 14, and performs generation/detection of Async packets, generation/detection of Iso packets, etc.

Figure 4:
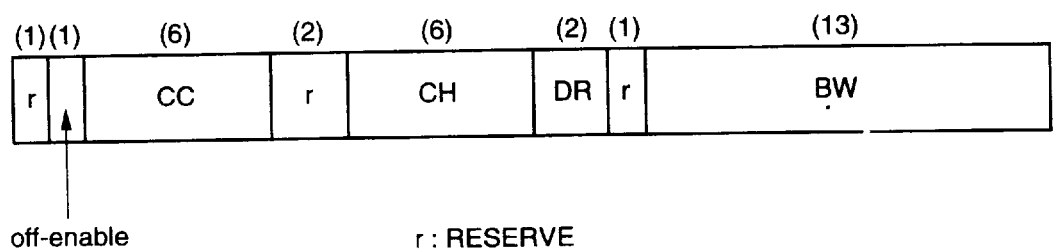
FIG. 4 is a diagram showing the content of an output control register.

The output control register 5 is the register which is described with reference to FIG. 4, and the operation of the Iso transmission FIFO 13 is controlled in accordance with the content of the register 5. As described above, another node can control the transmission of the Iso data by writing into the register.

The input control register 4 is constructed in the same manner as the output control register 5, and the operation of the Iso reception FIFO 14 is controlled in accordance with the content of the register 4. Another node can control the reception of the Iso data by writing into the register.

The other registers/memories 6 are registers/memories to store various data which are defined in the specification of the P1394, and they will not be described in this specification because they are not directly relevant to the present invention.

The Iso monitoring receiver 7 serves to monitor whether an Iso packet output onto the bus is output onto a prescribed channel. When the output right of another node is deprived, the past output-right holding node number storage device 8 stores the node number of the node which is deprived of its output right. Further, the internal status detecting device 9 is a device for detecting the internal status of a node, for example, operation modes such as REC, PB, etc. for a VTR. In FIG. 5, the output of the Iso receiver FIFO 14 is input to the Iso monitoring receiver device 7, however, an exclusively-used FIFO for outputting a packet to the Iso monitoring receiver 7 may be provided in the link layer controller 2 separately from the Iso reception FIFO 14.

Next, the operation of the node thus constructed will be described.

When the Async packet is transmitted, the CPU 3 writes data into the Async transmission FIFO 11 in the link layer controller 2. The data are stored in the Async transmission FIFO 11 and transmitted to the P1394 serial bus through the physical layer controller 1.

When the Async packet is received, the packet on the P1394 serial bus is received by the physical layer controller 1, and written into the Async reception FIFO 12 in the link layer controller 2. The packet is read out by the CPU 3 to execute a transaction (read/write/lock) to a register or memory which is indicated by an address field of the packet.

Likewise, the CPU 3 performs the Iso packet transmission by writing data into the Iso transmission FIFO 13, and performs the Iso packet reception by reading out a packet from the Iso reception FIFO 14.

(2) Iso monitoring receiver

The Iso monitoring receiver 7 checks the header of an Iso packet written in the Iso reception FIFO 14 to monitor whether or not the Iso packet is an output to a prescribed channel and notifies of the monitored result to the CPU 3. The internal status detection device 9 detects the internal status of a node which is set by an user's operation or the like, and notifies of it to the CPU 3. If the Iso monitoring receiver 7 detects that no Iso data output to the channel exists for a fixed time (for example, one second) and the internal status detection device 9 detects that the internal status of the node is set to an output-allowed state (for example, PB status in an AV equipment), the CPU 3 accesses the REG 1 and the REG 2 of the resolver node to secure prescribed channel and band. Thereafter, the CPU sets the CC and the off-enable of the output control register 5 of the node thereof to 1 to start the data output to the bus.

FIG. 6A through FIG. 6D show an operation of the node having the Iso monitoring receiver according to this embodiment of the present invention. As shown, nodes A, B, . . . N are connected to one another through the P1394 serial bus.

Figure 6A:
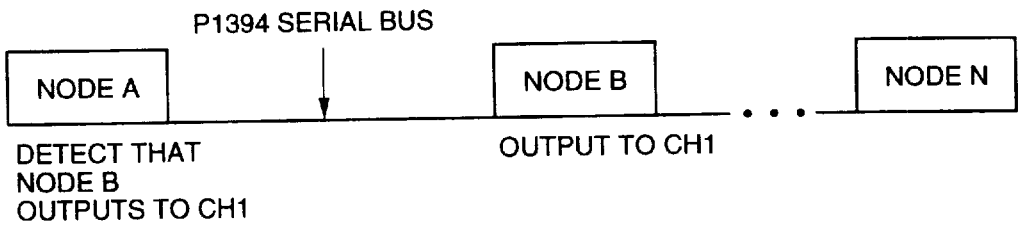
FIG. 6A through FIG. 6D are diagrams showing an operation of the node having an Iso monitoring receiver according to one embodiment of the present invention.

In FIG. 6A, the node B is outputting Iso data to a channel 1. The channel 1 is a channel which is set in a default for transmission of an AV device, for example. The node A wishes to output Iso data to the channel 1. The node A receives the Iso packet which is output to the bus, and it checks the channel number and the node number of a transmitting node which are written at the header thereof to know that the node B outputs the data to the channel 1.

Figure 6B:
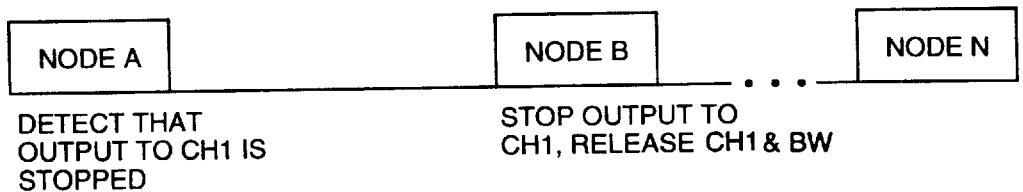

In FIG. 6B, after stopping the data output to the channel 1, the node B accesses the REG 1 and the REG 2 of the resolver node to release the channel 1 and the used band. From this time, the node A has received no Iso communication packet having the header at which "1" is written, and thus the node A knows that the output to the channel 1 is stopped.

Figure 6C:
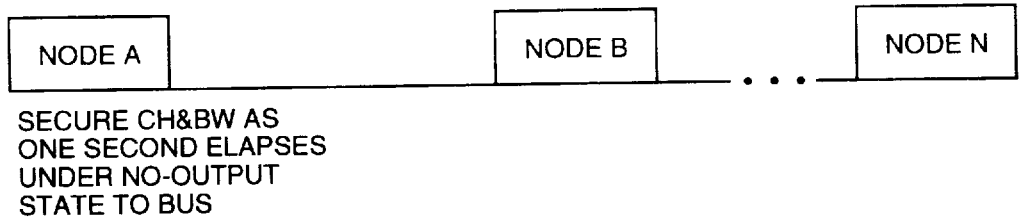

In FIG. 6C, since one second elapses from the time when the node A detects that there is no output to the channel 1, the node A accesses the REG 1 and the REG 2 of the resolver node to secure the channel 1 and the band required for the Iso data.

Figure 6D:
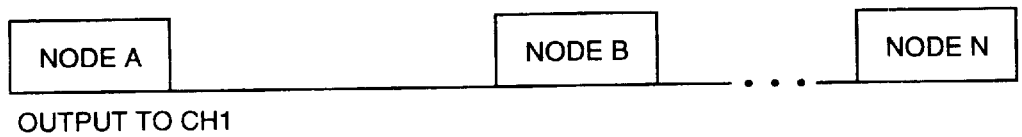

In FIG. 6D, since the channel 1 and the used band are secured, the node A starts the output of the Iso data to the channel 1.

As described above, according to this embodiment, the node concerned monitors the Iso packet output to the bus, and if it detects that another node does not output data to a prescribed channel, the node concerned secures the channel to start its output to the bus. Therefore, such a situation that no node outputs Iso data to the bus can be avoided.

(3) Past output-right holding node number storage device

When the node concerned deprives another node of an output right, the past output-right holding node number storage device 8 stores the node number of the node which is deprived of the output right. That is, if the node concerned succeeds in write-in (off-enable=0, CC=0) of the output stop into the output control register of another node which is outputting the Iso data, the node number of the other node is stored. The node concerned uses the channel and the band which have been used by the other node, and outputs the Iso data to the bus. Thereafter, when the node concerned stops the output, it releases the used channel and band and then transmits, with an Async packet, a command (output demand command) demanding the node of the node number stored in the past output-right holding node number storage device 8 to make an output to the deprived channel.

Figure 7A:
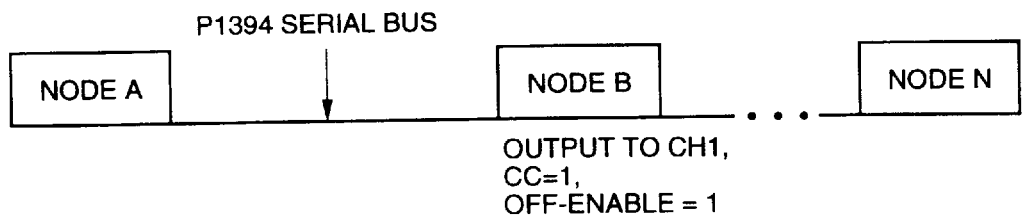
FIG. 7A through FIG. 7C are diagrams showing an operation of the node having a past output right holding node number storage device according to one embodiment of the present invention.
Figure 7B:
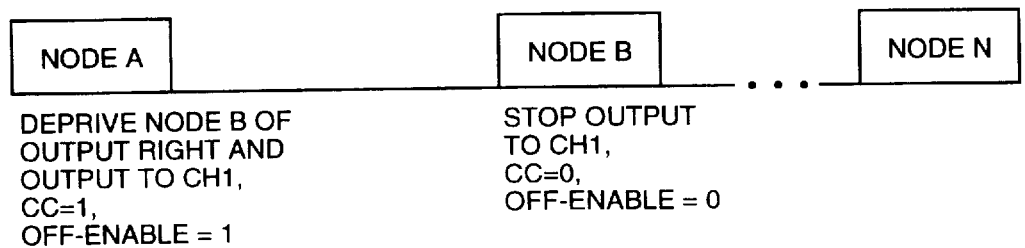
Figure 7C:
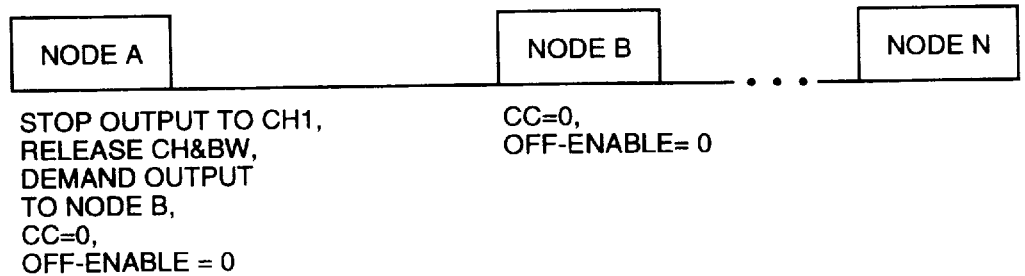

FIG. 7A through FIG. 7C show examples of the above operation. In these figures, the nodes A, B, . . . , N are connected to one another through the P1394 serial bus.

In FIG. 7A, the node B generates an output to the channel 1. As described above, the channel 1 is one that is set in a default for transmission of AV equipment, for example. In the node B, CC=1, and off-enable=1. Accordingly, any other node may clear CC of the node B to stop the output of the node B.

In FIG. 7B, the node A stops the output of the node B, and clears the CC and the off-enable in the output control register of the node B to zero to deprive the output right from the node B. As a result, the node B stops the output to the channel 1. The node A stores the node number of the node B into the past output-right holding node number storage device 8. The node A uses the channel 1 and the transmission band which are deprived from the node B to output the Iso data to the bus. If the band which is deprived from the node B is deficient for a band which is needed by the node A, the node A accesses the REG 2 of the resolver node to secure a desired band.

In FIG. 7C, the node A clears the CC and the off-enable to zero to stop the output of the Iso data to the bus, and then accesses the REG 1 and the REG 2 of the resolver node to release the channel and the transmission band. Further, the node A transmits, with an Async packet, a command demanding the node B corresponding to the node number stored in the past output-right holding node number storage device 8 to output the Iso data to the channel 1.

In this case, the node which outputs Iso data by detecting the absence of any node outputting Iso data to the bus as described with reference to FIG. 6A through FIG. 6D is desired to start output proceedings such as securing channel and band after the node A stops its output and sends it can output command to the node B and after taking into consideration of a sufficient time for the node B to start outputting the Iso data in response to the output demanding command.

(4) Processing at the output stop time

Figure 8:
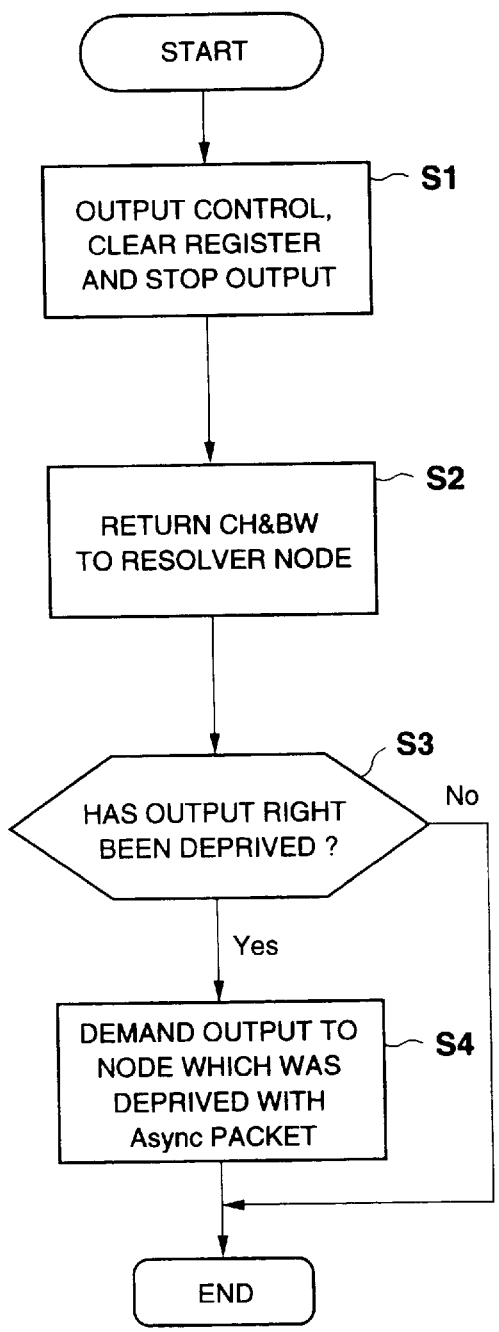
FIG. 8 is a flowchart showing a processing to be performed when the output is stopped.

FIG. 8 shows a processing flow when a node stops the outputting of Iso data. The processing flow contains not only the processing that it deprives another node of an output right as shown in FIG. 7A through FIG. 7C, but also a processing that it secures a channel and a transmission band to output the Iso data by itself and then stops the output.

In FIG. 8, step S1 shows a processing that the node clears the CC and the off-enable of its output control register to zero to stop the output. Further, step S2 shows a processing that the node accesses the REG 1 and the REG 2 of the resolver node to release the channel and the transmission band which are used for the outputting of the Iso data. Step 3 shows a judgment as to whether or not the node has deprived another node of its output right. That is, when the node itself secures a channel and a transmission band to output the Iso data and then stops the output, the processing is finished with such operations. On the other hand, as shown in FIG. 7A through FIG. 7C, when the node deprives another node of an output right to output the Iso data and then stops the output, the process goes to step S4 to transmit with an Async packet a command demanding the outputting of the Iso data to the deprived channel to the node which is deprived of the output right.

(5) Processing at the reception time of output demanding command

Figure 9:
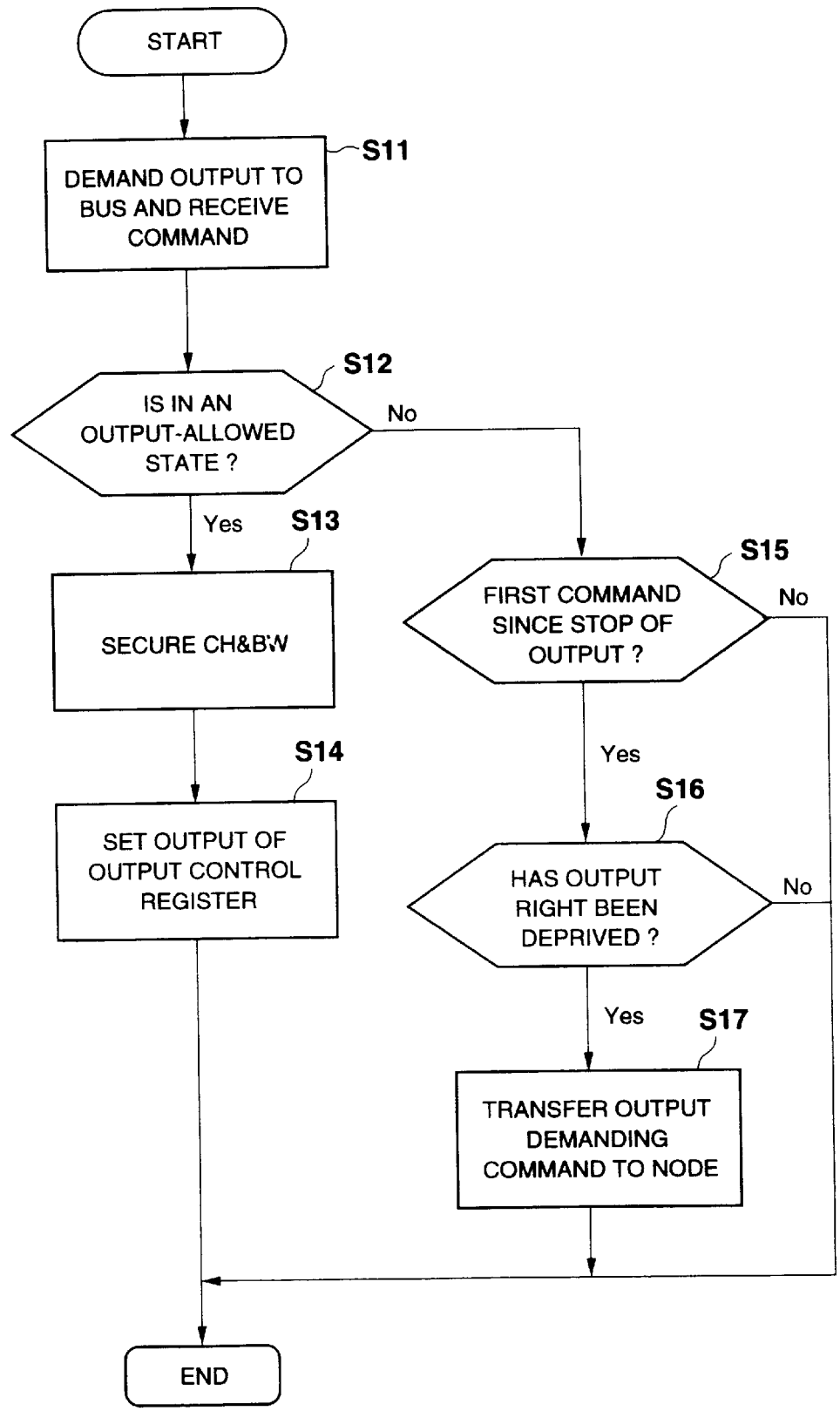
FIG. 9 is a flowchart showing a processing to be performed when an output demanding command has been received.

FIG. 9 is a flowchart showing a processing when each node receives the output demanding command as described above.

When receiving the output demanding command (S11), each node secures the channel and the band through the writing operation into the prescribed REG1 and REG2 of the resolver node (S13) if the node is in an output-allowed state (Yes in S12). Further, the node starts to output the Iso data through the writing operation into the output control register thereof (CC=1, off-enable=1) (S14).

If a node is not in an output-allowed state (No in S12) when the node receives the output demanding command (S11), it is checked whether the command is the first command since the time when a node depriving another node of its output right stops the output of the Iso data to the bus (S15). If it is the first command (Yes in S15), the past output right holding node number storage device 8 is checked to judge whether the node has previously deprived another node of its output right. If the node has deprived (Yes in S16), the node transmits the output demanding command to the other node (S17). If the node has not deprived, the node does nothing (No in S16).

If the internal status of the node is not the output-allowed status as described above when the node receives the output demanding command (S11), it is checked whether the command is the first command since the time when a node depriving another node of the output right stops the output of the Iso data to the bus. If it is a second or subsequent reception of the same command (No in S15), there is a possibility that the transmission of the command is made in a loop, and thus the transmission of the command is ceased to prevent occurrence of undesired communication traffic.

This embodiment is based on the use of the P1394 serial bus as the bus, however, any bus may be used insofar as it can communicate data and control signals between nodes. Any format may be used for the output demanding command insofar as the command means the output to a prescribed common channel used between respective nodes, and it has the same interpretation among the nodes. Further, when the transmission of the command is in a loop, the transmission may be continued until some node outputs without taking the trouble to cease the transmission.

As described above in detail, according to the present invention, the following effects can be obtained.

(1) By monitoring the data output to the bus and detecting that any node does not output data to the bus, the node concerned outputs data to the bus. Therefore, there is no situation in which any node does not output data to the bus. Accordingly, not only the communication system is effectively used, but also a bus output status which coincides with the internal status of the node can be obtained.

(2) By storing the node number of the node which is deprived of its output right to the bus, the output demanding command is transmitted to the node at the output stop time. Further, by interpreting/executing the command, the transition of the output node over the bus can be estimated, and can be made natural and compatible.

(3) When the node receives the output demanding command, but the node is in an output-impossible state, the transition of the output node can be made more natural as described above by transmitting the received output demanding command.

(4) When a plurality of output demanding commands are supplied while no node output to the bus appears, the command is not transmitted to suppress the traffic on the bus and effectively use a resource such as a band.

What is claimed is:

1. A communication system having a plurality of electronic devices connected to each other through a bus supporting multiple communication channels for data communication, said communication system comprising:

monitoring means for monitoring data to determine whether any of the electronic devices is using a preselected communication channel on said bus;

internal state detecting means for detecting an internal status of each of the electronic devices, said internal status including an output-enabled state and an output-disabled state; and control means for supplying control data for causing an electronic device to start transmitting the data to said bus using said preselected communication channel if no other electronic device is using said preselected communication channel for a predetermined period of time as determined by said monitoring means and if said electronic device is in said output-enabled state as determined by said internal state detecting means.

2. A communication system having a plurality of electronic devices connected to each other through a bus supporting multiple communication channels for transferring data, said communication system comprising:

storage means for storing identification information of an electronic device if control data transmitted to said bus is stopped by said electronic device; and control means for transmitting a command to said electronic device identified by said identification information, said command requesting said electronic device to transmit to said bus after each of the electronic devices stops outputting to said bus.

3. The communication system according to claim 2, wherein said electronic device starts transmitting data to said bus after securing a communication channel and a band if said electronic device is in an output-enabled state.

4. The communication system according to claim 2, wherein if said electronic device is in an output-disabled state such that data can not be output to said bus and if said electronic device keeps another electronic device from outputting data to said bus, said electronic device transfers said command to said another electronic device.

5. The communication system according to claim 4, wherein when said electronic device receives said command a predetermined number of times after transferring said command to said another electronic device while no data is output to said bus, said electronic device stops transferring said command.

6. A communication method using a plurality of electronic devices connected to each other through a bus supporting multiple communication channels for data communication, said communication method comprising the steps of:

monitoring data to determine whether any of the electronic devices is using a preselected communication channel on said bus;

detecting an internal status of each of the electronic devices, said internal status including an output-enabled state and an output-disabled state; and supplying control data for causing an electronic device to start transmitting the data to said bus using said preselected communication channel if no other electronic device is using said preselected communication channel for a predetermined period of time as determined in said monitoring step and if said electronic device is in said output-enabled state as determined in said detecting step.

7. A communication method using a plurality of electronic devices connected to each other through a bus supporting multiple communication channels for transferring data, said communication method comprising the steps of:

storing identification information of an electronic device if control data transmitted to said bus is stopped by said electronic device; and transmitting a command to said electronic device identified by said identification information, said command requesting said electronic device to transmit to said bus after each of the electronic devices stops outputting to said bus.

* * * * *